(12) United States Patent
Yamamoto

(10) Patent No.: US 8,176,297 B2
(45) Date of Patent: May 8, 2012

(54) ADAPTIVE FETCH ADVANCE CONTROL FOR A LOW POWER PROCESSOR

(75) Inventor: Hirofumi Yamamoto, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 746 days.

(21) Appl. No.: 12/347,848

(22) Filed: Dec. 31, 2008

(65) Prior Publication Data

US 2010/0169624 A1    Jul. 1, 2010

(51) Int. Cl.
G06F 9/30    (2006.01)
(52) U.S. Cl. ....................................... 712/205
(58) Field of Classification Search .................. None
See application file for complete search history.

(56) References Cited

U.S. PATENT DOCUMENTS

| | | | | |
|---|---|---|---|---|
| 5,623,615 A * | 4/1997 | Salem et al. | | 712/238 |
| 5,835,967 A * | 11/1998 | McMahan | | 711/213 |
| 6,564,313 B1 * | 5/2003 | Kashyap | | 712/207 |
| 7,702,857 B2 * | 4/2010 | Gill et al. | | 711/137 |
| 7,925,865 B2 * | 4/2011 | Chou et al. | | 712/207 |
| 7,962,724 B1 * | 6/2011 | Ali | | 712/207 |
| 2007/0283101 A1 * | 12/2007 | El-Essawy et al. | | 711/137 |

OTHER PUBLICATIONS

"C55x DSP architecture," Author: unknown, Publisher: unknown, downloaded from http://dualist.stanford.edu/~ee265/handouts/25-arch.pdf on Dec. 8, 2008, pp. 1-12.
"Architecture and Implementation of the ARM Cortex-A8 Microprocessor" white paper, ARM Ltd., Author: unknown, Oct. 2005, pp. 1-10.
Joseph Desposito, "Modern DSP Chips Serve Up Variations on a Theme," Electronic Design Online ID # 19556, Aug. 28, 2008, pp. 1-3.
"TMS320C55x DSP Programmer's Guide, Preliminary Draft," Texas Instruments Incorporated, Author: unknown, Aug. 2001, pp. 3-15 through 3-41, 4-42 through 4-84, and B-6 through B-29.

* cited by examiner

*Primary Examiner* — Robert Fennema
(74) *Attorney, Agent, or Firm* — Michael A. Davis, Jr.; W. James Brady; Frederick J. Telecky, Jr.

(57) ABSTRACT

A digital signal processor (DSP) includes an instruction buffer queue (IBQ) with multiple lines, as well as a modifiable fetch advance parameter to specify a fetch advance setting for the IBQ. The DSP also has a control flow module. In response to execution of a program in the DSP, the control flow module may automatically determine whether a branch has been predicted for the program, or for a portion of the program. The control flow module may automatically reduce the fetch advance parameter in response to determining that a branch has been predicted for the program. Also, the control flow module may automatically increase the fetch advance setting in response to determining that no branch has been predicted for a portion of the program. Other embodiments are described and claimed.

20 Claims, 3 Drawing Sheets

ADAPTIVE FETCH ADVANCE CONTROL FOR A LOW POWER PROCESSOR

FIELD OF THE INVENTION

The present invention generally relates to data processing systems. More particularly, the invention relates to efficient techniques for fetching instructions to be executed in a data processing system. Still more particularly, a processor for a data processing system may adaptively control fetch advance, to efficiently fetch instructions in advance of instruction execution.

BACKGROUND OF THE INVENTION

A digital signal processor (DSP) is an integrated circuit designed for high-speed data manipulation and used in audio, communications, image manipulation, and other data acquisition and data control applications. (Microsoft Computer Dictionary, $4^{th}$ ed., Microsoft Press, 1999). Compared to general purpose processors (GPPs), DSPs are optimized for signal processing applications. Specifically, DSPs are typically designed to deal with analog signals, to handle demanding mathematical computations, and to provide substantially real-time response.

For example, most signal processing functions use multiply-and-accumulate operations. A "multiply-and-accumulate" operation is an operation in which two series of numbers are multiplied, and results are summed (e.g., Result:=X1*C1+X2*C2+X3*C3 . . . Xn*Cn). DSPs offer many architectural features, such as a multiply-and-accumulate (MAC) instruction, that actually reduce the number of instructions necessary for efficient signal processing. Thus, DSPs typically perform operations like multiply-and-accumulate much more efficiently than those kinds of operations can be performed by GPPs.

DSPs are used in television receivers, vehicle control systems, cellular telephones, portable music players, digital cameras, telephony infrastructure, and many other kinds of devices. Some applications, particularly those relying on battery power, require DSPs with good power efficiency. For purposes of this disclosure, a DSP with good power efficiency may be referred to as a low power DSP or a low power processor.

SUMMARY OF THE INVENTION

A DSP includes an instruction buffer queue (IBQ) with multiple lines, as well as a modifiable fetch advance parameter to specify a fetch advance setting for the IBQ. The DSP also has a control flow module. In response to execution of a program in the DSP, the control flow module may automatically determine whether a branch has been predicted for the program, or for a portion of the program. The control flow module may automatically reduce the fetch advance parameter in response to determining that a branch has been predicted for the program. Also, the control flow module may automatically increase the fetch advance setting in response to determining that no branch has been predicted for a portion of the program. Such control of the fetch advance may increase efficiency by reducing the number of instructions that the DSP prefetches but does not execute, due to branches, for instance. Other embodiments are described and claimed.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION OF ONE OR MORE EMBODIMENTS

Figure 1:
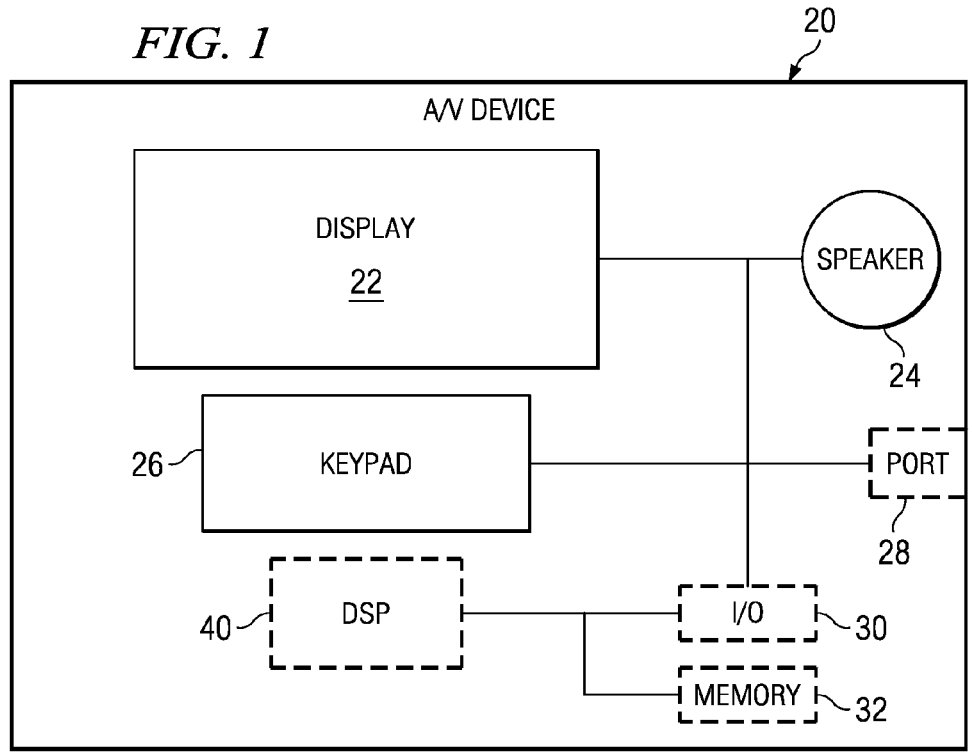
FIG. 1 is a block diagram depicting an example embodiment of a product that includes a DSP according to an example embodiment of the present invention.

Some conventional DSPs sacrifice some power efficiency to achieve faster execution. For instance, a DSP may include a fetch pipeline and an execution pipeline, and power may be used to fetch instructions in advance, to reduce the number of stalls for the execution pipeline. That is, the DSP may load instructions into the fetch pipeline before those instructions are needed by the execution pipeline. However, the DSP may not actually execute all of the prefetched instruction, due to branches for instance. Power efficiency may be adversely affected by prefetching instructions that end up not being needed.

The storage used to hold instructions that have been fetched in advance may be referred to as the instruction buffer queue (IBQ). The distance in the IBQ between the current instruction to be dispatched to the execution pipeline and the latest instruction that has been fetched in advance may be referred to as the current fetch advance.

Many DSPs primarily execute two different basic kinds of programs: signal processing code and control code. Signal processing code typically requires a larger fetch advance size, due in part to the frequent use of longer instructions, such as dual MAC instructions. In addition, signal processing code typically uses fewer branch instructions than control code. Consequently, signal processing code typically ends up skipping or trashing relative few prefetched lines in the IBQ. A relatively high fetch advance setting may therefore be desired when executing signal processing code.

Control code, by contrast, typically relies more on shorter instructions, such as load/store and branch instructions, and control code typically uses significantly more branch instructions. Therefore, a relatively low fetch advance setting may be beneficial when executing control code, to increase power efficiency. In addition, since control code typically uses shorter instructions, a low fetch advance setting will typically be sufficient to avoid stalls in the execution pipeline. Consequently, power may be saved with little or no reduction in the speed of executing the control code.

A DSP may feature a modifiable fetch advance setting. The amount of fetch advance may be adjusted according to the device and/or application to use the DSP. For instance, one conventional approach for using fetch advance is to determine the fetch advance size that maximizes the speed of the execution pipeline for signal processing code, and then to use that size for all purposes (e.g., for signal processing code and for control code). When a DSP uses the same fetch advance setting for all programs, it may be said to use a static fetch advance setting. A static fetch advance setting will typically result in unnecessary power usage when control code is executing.

By contrast, the present disclosure involves a DSP which dynamically modifies its fetch advance setting in response to changing conditions. Such a DSP may be said to use a dynamic or adaptive fetch advance setting. As described in greater detail below, the present disclosure pertains to DSPs that use adaptive fetch advance control for improved power efficiency, relative to DSPs without adaptive fetch advance control.

In one embodiment, the DSP dynamically modifies its fetch advance setting based on characteristics of the currently executing program. Consequently, as described in greater detail below, the DSP may use a small fetch advance for control code, and a large fetch advance for signal processing code. Such adaptive fetch advance control may allow the DSP to achieve trash line reduction for control code, with little or no cycle loss for signal processing code.

FIG. 1 is a block diagram depicting an example embodiment of a product that includes a DSP 40 according to an example embodiment of the present invention. In particular, FIG. 1 depicts an audio/video (A/V) device 20, such as a portable, battery-powered music and video player. DSP 40 communicates, directly or indirectly, with various other components of device 20, such as external memory 32, a display 22, a speaker 24, a keypad 26, an input/output (I/O) port 28 for communicating with other electronic devices, etc. DSP 40 may communicate with the other components via one or more input/output modules 30, for instance.

In another embodiment, the A/V device may use different peripherals. Moreover, although an A/V device is used to illustrate one embodiment of the present invention, DSPs according to the present invention are not limited to use in A/V devices, but may be used in a wide range of devices.

Figure 2:
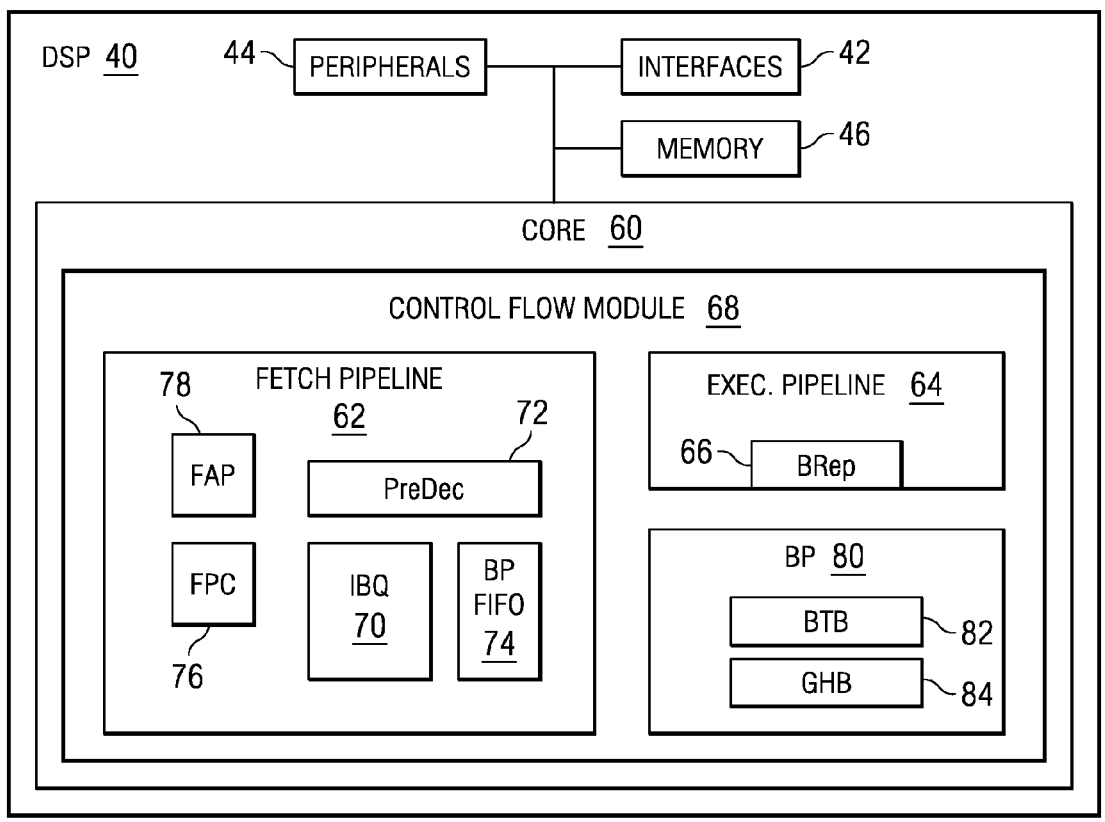
FIG. 2 is a block diagram illustrating the DSP of FIG. 1 in greater detail.

FIG. 2 is a block diagram illustrating the DSP 40 in greater detail. As shown, DSP 40 includes a core 60 that communicates with internal memory 46, with various peripherals 44 within DSP 40, and with various interfaces 42 to components outside of DSP 40.

Core 60 includes various subcomponents, including a fetch pipeline 62, an execution pipeline 64, and a branch prediction (BP) module 80. Fetch pipeline 62 and execution pipeline 64 are decoupled, in that a stall in fetch pipeline 62 doesn't necessarily cause a stall in execution pipeline 64. In one embodiment, fetch pipeline 62, execution pipeline 64, and BP module 80 are implemented as parts of a control flow module 68.

BP module 80 may implement a global history branch predictor, using structures such as a branch target buffer (BTB) 82 and a global history buffer (GHB) 84. The BTB may indicate whether or not the current program fetch address contains a branch instruction, and may provide the target address of that branch instruction. Thus, a hit in the BTB indicates a branch instruction at the corresponding program fetch address. The GHB may contain data concerning the strength and direction of previous branches.

Fetch pipeline 62 fetches instruction packets from memory 46 into IBQ 70, and control flow module 68 uses IBQ 70 to feed execution pipeline 64. Fetch pipeline 62 includes a fetch program counter (FPC) 76, for issuing program bus requests. FPC 76 may also include a state machine to deal with multiple requests in the program bus. For purposes of this disclosure, the instruction packets fetched into IBQ 70 may be referred to as undecoded packets.

In one embodiment, each undecoded packet is eight bytes long. However, the instruction set architecture (ISA) of DSP 40 may include instructions that are less than eight bytes long, and instructions that are greater than eight bytes long. For instance, instruction length may vary in length from two bytes to sixteen bytes. Accordingly, the instruction packets that fetch pipeline 62 feeds to execution pipeline 64 can have variable lengths, from two bytes to sixteen bytes.

Fetch pipeline 62 also includes a predecoder 72 for performing predecode operations on the instructions in IBQ 70 before feeding those instructions to execution pipeline 64. Accordingly, the instruction packets that are fed into fetch pipeline 62 may be referred to as predecoded packets.

In addition, fetch pipeline 62 includes a BP first in, first out (FIFO) queue 74, to hold prediction data from BP module 80. For instance, BP module 80 may create a BP FIFO entry for each undecoded packet in IBQ 70 that contains a predicted branch. Each BP FIFO entry may include the location of the packet or instruction that is predicted to branch.

Furthermore, control flow module 68 may use BP FIFO queue 74 to check for prediction hits. For example, when predecoding an instruction, predecoder 72 may compare the location of that instruction with the location specified in the entry at the top of the BP FIFO queue 74. When those locations match, control flow module 68 may determine that the instruction is predicted to branch.

Also, execution pipeline 64 may maintain a BTB/GHB report (BRep) 66, which indicates whether branch predictions were accurate (i.e., whether predicted branches were actually taken). For instance, whenever fetch pipeline 62 dispatches a predicted instruction (i.e., an instruction which is predicted to branch) to execution pipeline 64, control flow module 68 may also provide execution pipeline 64 with the corresponding BP FIFO entry (e.g., the top BP FIFO entry). The prediction info from the BP FIFO entry may then proceed through execution pipeline 64 together with other information for the predicted instruction, such as the instruction binary code, read register value, calculated results, etc. Control flow module 68 may then compare the predicted result against the actual result to determine the accuracy of the branch prediction. Control flow module 68 may update BRep 66 according to the determined accuracy. However, adaptive fetch advance control may be performed without regard to BRep 66, as fetch advance may be automatically adjusted based on predicted branches, without regard to prediction accuracy.

Fetch pipeline 62 also includes a modifiable fetch advance parameter (FAP) 78.

Figure 3:
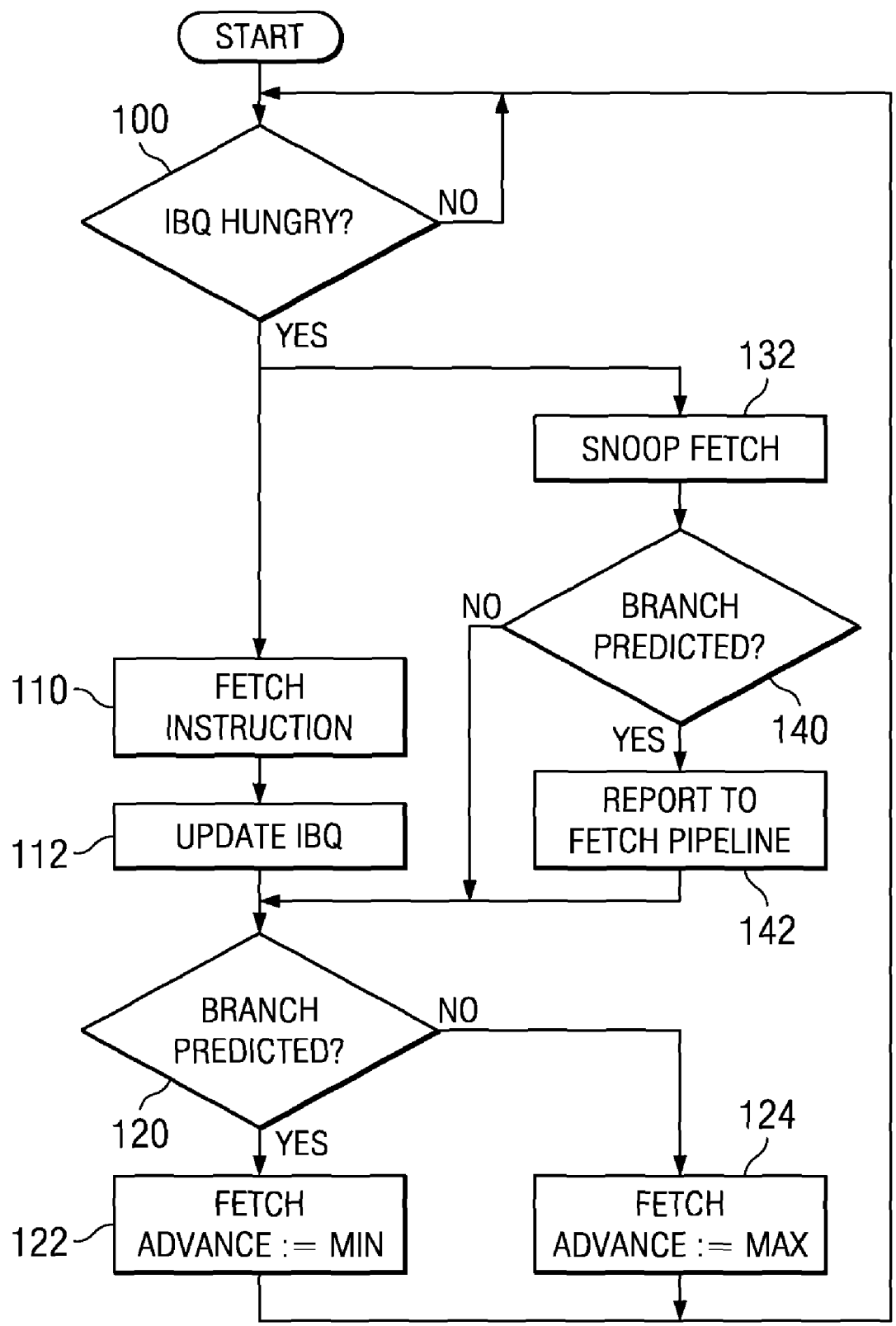
FIG. 3 is a flowchart showing a process for utilizing adaptive fetch advance control, according to an example embodiment of the present invention.

FIG. 3 is a flowchart showing an example process for utilizing adaptive fetch advance control, in the context of DSP 40. As shown at block 100, the process may begin with fetch pipeline 62 determining whether or not IBQ 70 is hungry. In other words, fetch pipeline 62 determines whether an instruction packet should be fetched and loaded into IBQ 70. One of the factors that determine whether IBQ 70 is hungry is whether IBQ 70 contains as many prefetched lines as are called for by the current fetch advance setting.

Figure 4:
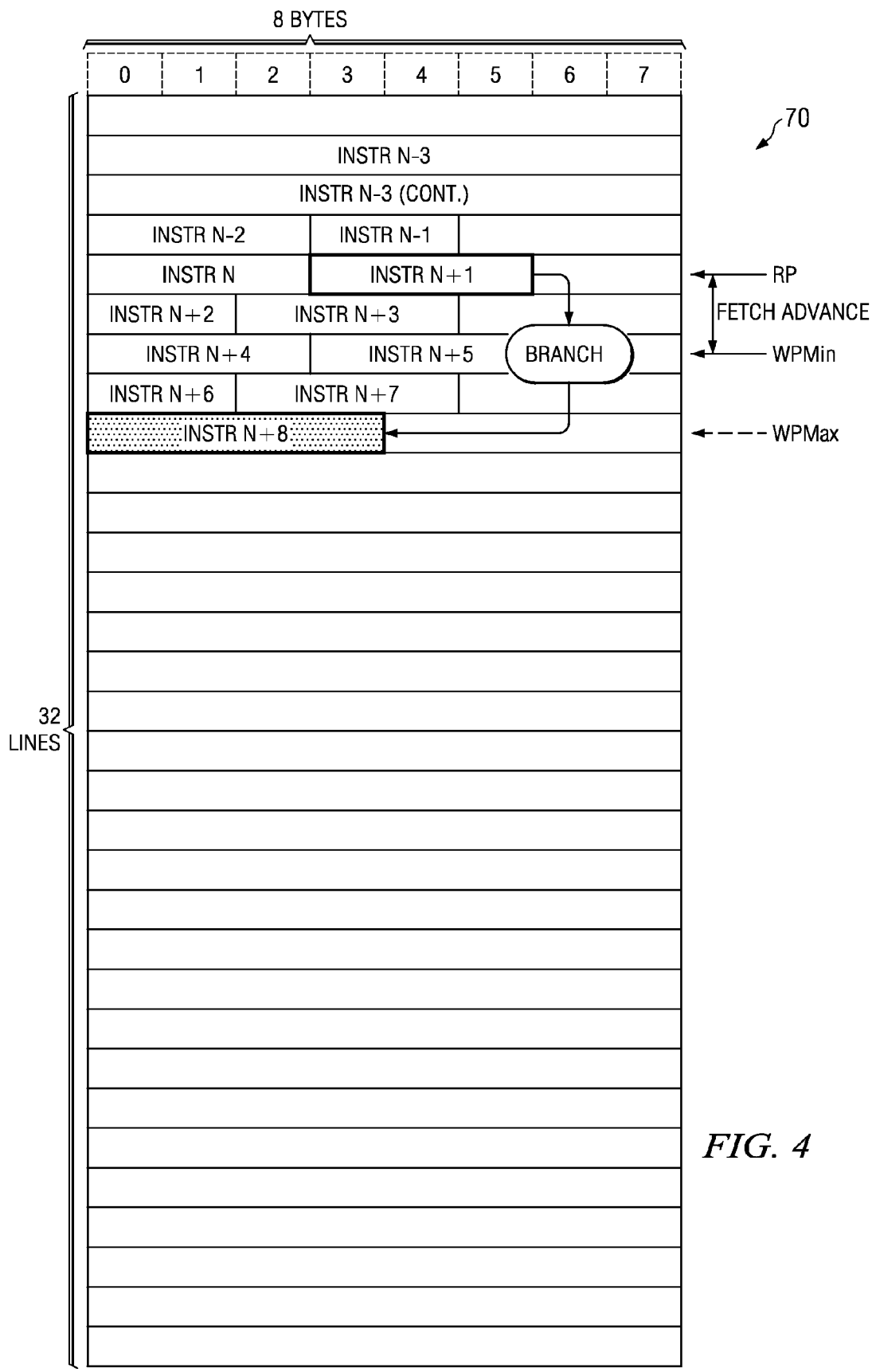
FIG. 4 is a block diagram depicting the instruction buffer queue of FIG. 2 in greater detail.

FIG. 4 is a block diagram depicting IBQ 70 in greater detail. In this embodiment, IBQ 70 uses 32 lines, along with a read pointer (RP) and a write pointer (WP), to implement a circular queue. In the illustrated embodiment, each line holds 8 bytes. The read pointer points to the line from which the next instruction will be fed to execution pipeline 64. The write pointer points to the line to be filled by the next program fetch. As described in greater detail below, the position of the write pointer may depend upon the fetch advance setting. For instance, if the fetch advance parameter is set to a minimum value (e.g., two), the write pointer may point two lines past the read pointer, as depicted by the arrow labeled "WPmin." By contrast, if the fetch advance parameter is set to a maximum value (e.g., four), the write pointer may point four lines past the read pointer, as depicted by the arrow labeled "WPmax."

The fetch advance setting specifies how many lines should be fetched in advance. Thus, if FAP 78 is set to two, IBQ 70 will not be hungry (and therefore will not fetch another instruction) as long as the write pointer is two or more lines past the read pointer. Similarly, a fetch advance setting of four will provide for a fetch advance of four lines.

As described in greater detail below, at least one embodiment of the present invention pertains to automatically adjusting the fetch advance setting, based on one or more characteristics of the instructions in IBQ 70. For instance, DSP 40 may set FAP 78 to a minimum value (FAMin) when IBQ 70 contains instructions that are predicted to branch. And when IBQ 70 (or a predetermined portion thereof) does not contain instructions that are predicted to branch, DSP 40 may set FAP 78 to a maximum value (FAMax).

As indicated above, in FIG. 4, the terms "WPMin" and "WPMax" refer respectively to write pointers positioned according to FAMin and FAMax settings, where FAMin is two lines and FAMax is four lines. Accordingly, FIG. 4 shows a fetch advance of two lines between the read pointer and WPMin, while changing the setting to FAMax would keep IBQ hungry until there are four lines between the read pointer and the write pointer (e.g., WPMax). When the distance between the read pointer and the write pointer matches or exceeds the fetch advance setting, IBQ would no longer be hungry, and fetch pipeline 62 would suspend fetches. Fetch pipeline 62 may resume fetches once the distance between the read pointer and the write pointer is shorter than the fetch advance setting. In addition, fetch pipeline 62 may resume fetches when the executing program takes a non-predicted branch.

Referring again to FIG. 3, if IBQ 70 is hungry, fetch pipeline 62 fetches another instruction packet into IBQ 70, as shown at blocks 110 and 112. For example, fetch pipeline 62 may use FPC 76 to fetch eight bytes. Fetch pipeline 62 may then increment the write pointer.

In addition, as shown at block 132 and 140, BP module 80 may snoop the memory fetch request of fetch pipeline 62, and may determine whether the packet being fetched has a predicted branch. BP module 80 may make this determination by consulting BTB 82, to determine whether the current program fetch address contains a branch instruction. If BP module 80 detects a predicted branch, BP module 80 may report the predicted branch to fetch pipeline 62, as shown at block 142. For instance, BP module 80 may add an entry that includes the location of the newly fetched packet to BP FIFO queue 74.

As shown at block 120, predecoder 72 may then determine whether a branch has been predicted for the newly fetched packet. For instance, as indicated above, predecoder 72 may compare the location of that packet with the location specified in the entry at the top of the BP FIFO queue 74. When those locations match, control flow module 68 may determine that the packet includes a predicted branch. Thus, control flow module 68 may look ahead as far as the current fetch advance setting to detect branch predictions.

Control flow module 68 may then automatically increase or decrease the fetch advance setting, based at least in part on the result of the branch prediction determination. For instance, as shown at block 122, if a branch is predicted, control flow module 68 may set FAP 78 to a low or minimum value (e.g., FAMin). Otherwise, as shown at block 124, if no branches are predicted, control flow module 68 may set FAP 78 to a high or maximum value (e.g., FAMax). The process may then return to block 100, and fetch pipeline 62 may determine again whether IBQ 70 is hungry.

If control flow module 68 has just reduced FAP 78 from FAMax to FAMin, IBQ 70 will probably not be hungry, since, fetch pipeline 62 will probably have already fetched more lines in advance than are called for by the new fetch advance setting. For instance, when FAP 78 is set to four, IBQ 10 may typically contain three or four lines of prefetched instructions waiting to be executed. If FAP 78 is then reduced to two, IBQ 70 will not be hungry until after the number of lines of prefetched instructions falls below two.

FIG. 4 depicts how the operations of FIG. 3 would affect IBQ 70 according to an example program flow involving instructions N-3 through N+8. This example is based on values of two and four for FAMin and FAMax, respectively.

FIG. 4 also shows the instructions that would be prefetched into IBQ 70 if DSP 40 did not use adaptive fetch advance control. In particular, without adaptive fetch advance control, fetch pipeline 62 would fetch instruction packets into the line labeled RP, as well as the next three lines (assuming a static fetch advance setting of four). In the illustrated example, those four lines include instructions N through N+7. FIG. 4 also shows instruction N+8, but that instruction is depicted with dotted fill to indicate that instruction N+8 will not actually have been fetched while the read pointer is still at instruction N+1, since the line in IBQ for instruction N+8 will be beyond the fetch advance setting.

As illustrated by the arrows leading from instruction N+1 to instruction N+8, instruction N+1 is a branch instruction with the branch target of instruction N+8. However, when DSP 40 branches from instruction N+1 to instruction N+8, it skips over instructions N+2 through N+7. In other words, the lines in the IBQ between a branch source and a branch target become trash. Consequently, the power that was used by fetch pipeline 62 to prefetch instructions N+2 through N+7 was basically wasted.

By contrast, with adaptive fetch advance control, when control flow module 68 determines that a branch is predicted for instruction N+1, control flow module 68 will lower the prefetch advance setting. For instance, by changing the prefetch advance setting from four to two, control flow module 68 may reduce the number of unused instruction packets to be prefetched from three to one. FIG. 4 illustrates this reduction in prefetches, with the label WPMin showing the maximum number of prefetched lines according to a setting of FAMin, and WPMax showing the maximum number of prefetched lines according to a setting of FAMax.

In addition, when no branches are predicted within the predetermined look-ahead window, control flow module 68 may increase the prefetch advance setting from two to four. As indicated above, the look ahead distance pertains to branch prediction, and in particular specifies how far ahead (past the current read pointer) should the fetch pipeline look for predicted branches. The example of FIG. 4 is based on a look-ahead distance of four.

Thus, depending on program characteristics, control flow module 68 reduces the amount of power consumed by DSP 40, by automatically reducing the number of prefetches to be performed by fetch pipeline 62. In addition, control flow module 68 may also automatically increase the number of prefetches to be performed by fetch pipeline 62 when program characteristics indicate that a longer fetch advance setting could be beneficial. Consequently, this power reduction may be enjoyed with little or no adverse affect on speed of execution.

It has been estimated that approximately 40-50% of program prefetches are not used on some DSPs. It has also been estimated that adaptive fetch advance control as described herein may reduce the overall number of program fetch requests by about 5-10%, thereby significantly reducing power consumption, with no significant degradation of speed.

In light of the principles and example embodiments described and illustrated herein, it will be recognized that the illustrated embodiments can be modified in arrangement and detail without departing from such principles. For instance, this disclosure describes an embodiment that toggles between two lines and four lines for the fetch advance setting, but other embodiments may set the fetch advance to different values. Likewise, some embodiments may use a look-ahead distance lesser or greater than four.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims and all equivalents to such implementations.

What is claimed is:

1. A method for controlling instruction flow in a digital signal processor, the method comprising:
    automatically determining whether a branch has been predicted for a program, in response to execution of the program in a digital signal processor; and
    in response to determining that the branch has been predicted for the program, automatically reducing a fetch advance setting indicating a number of prefetch byes for the digital signal processor, wherein the operation of automatically reducing the fetch advance setting comprises automatically setting the fetch advance setting to a smaller, non-zero number of prefetch bytes.

2. The method according to claim 1, further comprising:
    prefetching an instruction packet into an instruction buffer queue (IBQ) in the digital signal processor; and
    wherein the operation of determining whether the branch has been predicted for the program comprises determining whether the prefetched instruction packet corresponds to a predicted branch.

3. The method according to claim 2, wherein the operation of determining whether the prefetched instruction packet corresponds to the predicted branch comprises:
    determining whether a branch taken buffer (BTB) in the digital signal processor predicts the branch for the prefetched instruction packet.

4. The method according to claim 3, wherein the operation of determining whether the prefetched instruction packet corresponds to the predicted branch further comprises:
    automatically updating a branch prediction (BP) data structure, in response to determining that the BTB predicts the branch for the prefetched instruction packet; and
    using the BP data structure to determine whether the prefetched instruction packet corresponds to the predicted branch.

5. The method according to claim 1, further comprising:
    determining whether any branch has been predicted for a portion of the program; and
    in response to determining that no branch has been predicted for the portion of the program, automatically increasing the fetch advance setting for the digital signal processor.

6. The method according to claim 5, wherein:
    the operation of automatically reducing the fetch advance setting comprises automatically setting the fetch advance setting to less than three prefetch lines; and
    the operation of automatically increasing the fetch advance setting comprises automatically setting the fetch advance setting to more than three prefetch lines.

7. The method according to claim 1, wherein the operation of determining whether the branch has been predicted for the program comprises:
    determining whether at least one branch has been predicted within a predetermined number of lines in an instruction buffer queue (IBQ) in the digital signal processor.

8. The method according to claim 7, wherein the operation of determining whether at least one branch has been predicted within the predetermined number of lines in the IBQ comprises:
    determining whether at least one branch has been predicted within the predetermined number of lines in the IBQ, starting at a read pointer for the IBQ.

9. A processor, comprising:
    a control flow module comprising:
        an instruction buffer queue (IBQ) with multiple lines; and
        a modifiable fetch advance parameter to specify a fetch advance setting indicating a number of prefetch byes for the IBQ;
    the control flow module operable to automatically determine whether a branch has been predicted for a program, in response to execution of the program in the processor, and to automatically modify the fetch advance parameter in response to determining that the branch has been predicted for the program, wherein automatically modifying the fetch advance parameter comprises automatically setting the fetch advance setting to a smaller, non-zero number of prefetch bytes.

10. The processor according to claim 9, wherein:
    the control flow module is operable to determine whether any branch has been predicted for a portion of the program; and
    the control flow module is operable to automatically increase the fetch advance setting for the processor in response to determining that no branch has been predicted for the portion of the program.

11. The processor according to claim 9, wherein:
    the control flow module is operable to determine whether at least one branch has been predicted within a predetermined number of lines in the IBQ, starting at a read pointer for the IBQ.

12. The processor according to claim 9, further comprising:
    a branch prediction (BP) data structure to hold entries that identify predicted branches; and
    wherein the control flow module is operable to use the BP data structure to determine whether the branch has been predicted for the program.

13. The processor according to claim 12, further comprising:
    a branch taken buffer (BTB) in the control flow module;
    wherein the control flow module is operable to determine whether the branch has been predicted for the program, based at least in part on the BTB 14. The processor according to claim 9, further comprising:
- a fetch pipeline and a branch prediction (BP) module within the control flow module;
- the fetch pipeline operable to prefetch an instruction packet into the IBQ; and
- the BP module operable to determine whether the branch has been predicted for the prefetched instruction packet and to provide the fetch pipeline with branch prediction data in response to determining that the branch has been predicted for the prefetched instruction packet.

15. The processor according to claim 14, further comprising:
- a first BP data structure in the BP module; and
- a second BP data structure in the fetch pipeline;
- wherein the BP module uses the first BP data structure to determine whether the branch has been predicted for the prefetched instruction packet; and
- the fetch pipeline uses the second BP data structure to determine whether the branch has been predicted for the program.

16. The processor according to claim 15, further comprising:
- the BP module operable to snoop the instruction packet when the fetch pipeline prefetches the instruction packet, and to update the second BP data structure in response to detecting a branch prediction for the snooped instruction packet.

17. An electronic device comprising:
a processor, comprising:
- a control flow module comprising:
  - an instruction buffer queue (IBQ) with multiple lines; and
  - a modifiable fetch advance parameter to specify a fetch advance setting indicating a number of prefetch byes for the IBQ; and
  - the control flow module operable to automatically determine whether a branch has been predicted for a program, in response to execution of the program in the processor, and to automatically modify the fetch advance parameter in response to determining that the branch has been predicted for the program, wherein automatically modifying the fetch advance parameter comprises automatically setting the fetch advance setting to a smaller, non-zero number of prefetch bytes; and
- at least one input/output (I/O) port responsive to the processor.

18. The electronic device according to claim 17, wherein:
- the processor further comprises a branch prediction (BP) data structure with entries to identify predicted branches; and
- wherein the control flow module uses the BP data structure to determine whether the branch has been predicted for the program.

19. The electronic device according to claim 17, wherein the control flow module comprises:
- a fetch pipeline operable to prefetch instruction packets into the IBQ; and
- a BP module operable to snoop instruction packets when the fetch pipeline prefetches the instruction packets, and to update a BP data structure in response to detecting branch predictions for the snooped instruction packets.

20. The electronic device according to claim 17, wherein:
- the control flow module determines whether any branch has been predicted for a portion of the program; and
- the control flow module automatically increases the fetch advance setting for the processor in response to determining that no branch has been predicted for the portion of the program.

* * * * *